Figure 1:
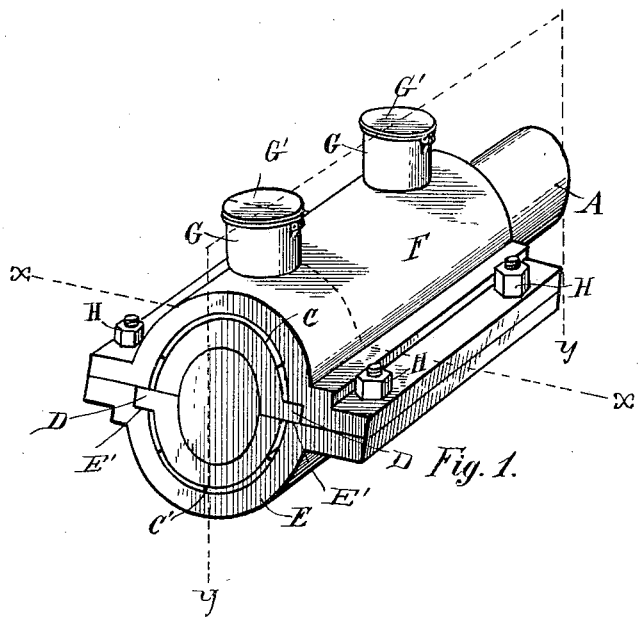

(No Model.) 2 Sheets—Sheet 1.

J. H. ALDRICH.
JOURNAL BOX.

No. 389,185. Patented Sept. 11, 1888.

Witnesses.
L. G. Wilker.
C. J. Webster.

Inventor:
Jonas H. Aldrich,
By William Webster,
Attorney.

(No Model.) 2 Sheets—Sheet 2.

J. H. ALDRICH.
JOURNAL BOX.

No. 389,185. Patented Sept. 11, 1888.

Witnesses.
L. G. Welker.
C. J. Webster.

Inventor.
Jonas H. Aldrich.
By William Webster,
Attorney.

United States Patent Office.

JONAS H. ALDRICH, OF BUTLER, INDIANA.

JOURNAL-BOX.

SPECIFICATION forming part of Letters Patent No. 389,185, dated September 11, 1888.

Application filed May 23, 1888. Serial No. 274,863. (No model.)

*To all whom it may concern:*

Be it known that I, JONAS H. ALDRICH, a citizen of the United States, residing at Butler, in the county of De Kalb and State of Indiana, have invented certain new and useful Improvements in Journal-Boxes with Interchangeable and Reversible Bearings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to journal-boxes with interchangeable and reversible bearings, and is designed to provide means whereby the usual unequal wear upon the bearings can be compensated for by changing the position of the bearing subjected to the greatest wear to that of the bearing having the least wear, thereby renewing the bearing and lining the journal.

The object of the invention is to make the bearing for a journal-box in sections capable of being transposed in their positions, as well as to provide means whereby the bearings can be made as an article of manufacture to be supplied to the trade.

The invention consists in forming the journal-box with recesses capable of receiving and firmly securing a series of interchangeable and reversible bearings, and also in the construction of the bearings with reference to the interchangeability, and means for lubricating the journal through perforations formed in the bearings regardless of the series that shall occupy the upper portion of the box.

It is usual to mount a band-pulley, fly-wheel, driving-gear, wind-wheel, or some prime motor upon the end of a shaft, a portion of the shaft being journaled in bearings within a journal-box. The weight of the wheel upon the shaft, or it may be the tension of the belt or the pressure of the gear, causes an unequal wear upon the bearings upon the box.

In the instance of a fly-wheel or wind-wheel the weight of the wheel causes the greatest wear upon the under bearing upon the inner end of the box and the upper bearing upon the outer end of the box; or, if a band-pulley and the belt are carried to a line-shaft overhead, the tension of the belt causes wear upon the inner upper and the outer lower bearing; or the pressure may be laterally, as in the case of parallel shafts upon which gears intermesh, in which event the wear is upon one side of the bearings at the inner end and the opposite side of the outer end. This unequal wear soon renders the bearings worthless, requiring the substitution of a new series, as well as throwing the shaft out of line. These objections are overcome by the arrangement shown in the drawings, in which—

Figure 2:
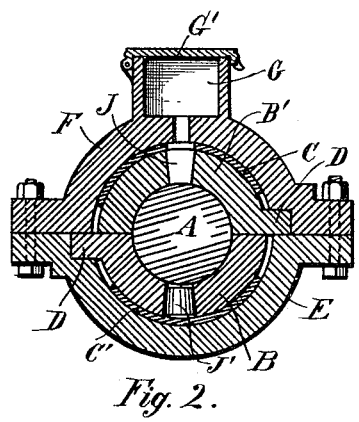
Figure 3:
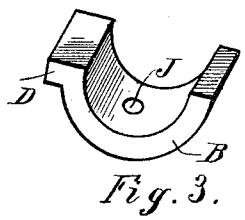
Figure 4:
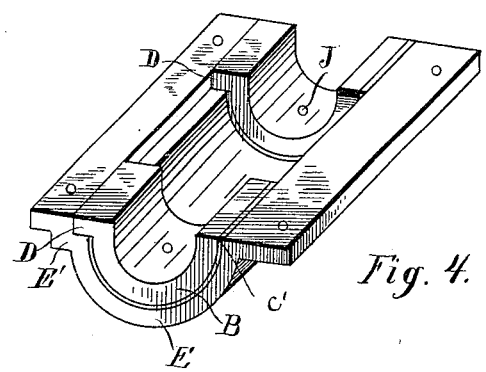
Figure 5:
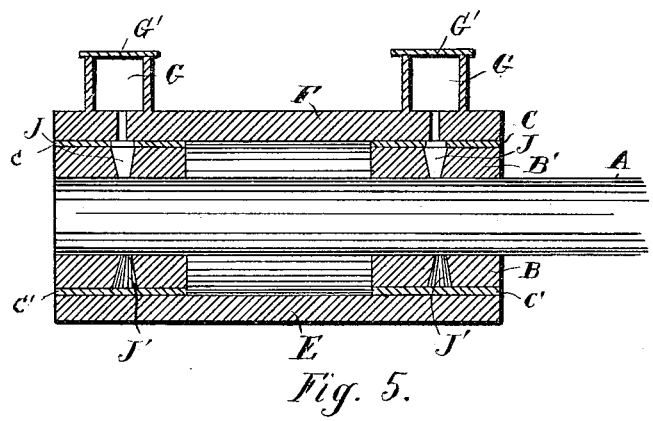

Figure 1 is a perspective view of a journal-box provided with interchangeable and reversible bearings. Fig. 2 is a transverse section on line *x x*, Fig. 1. Fig. 3 is a plan view of one of the interchangeable and reversible bearings. Fig. 4 is a top plan view of the lower section of box with interchangeable bearings in place. Fig. 5 is a longitudinal vertical section on lines *y y*, Fig. 1.

A designates the shaft, journaled in bearings B and B' within the box.

The box consists of the lower section, E, and the upper section, F, the sections being held in position by bolts H, in the usual manner. The upper section is provided with oil-receptacles G, having hinged covers G', for excluding extraneous matter, and a perforation leading from the receptacles to the bearing. The lower section, E, of the box has a recess, E', formed upon one side for the purpose of receiving a projection, D, formed upon the bearing, the upper section, F, having a like recess upon the opposite side for a similar purpose.

Each bearing is of semi-cylindrical form and provided with an oil-hole, J, at the center and a projecting lug, D, upon one side, preferably extending the entire width of the bearing.

J' designates a plug adapted to fit closely within perforation J of the sections, for a purpose hereinafter stated.

In assembling the parts a packing, C', is placed within section E of the journal-box. Two sections of bearings, either B or B', (it being immaterial which are used,) are, after inserting plug J' in the central perforation to render the bearings oil-tight, placed within the box. The lower side of the bearings rests upon the packing, which yields to the inequalities of surface of the bearing, thereby obviating the necessity of finishing the same. The upper section of bearings is placed upon the journal. A packing, C, similar to the lower packing, is placed upon the upper side, the upper section, F, is placed thereon, and the two sections E and F are secured in position by bolts H. In operation, should this wear be greater upon any one or two of the bearings, the upper section of box is removed and the bearings are transposed in position. To illustrate: The lower bearing at the front end of the box can be placed at the rear end, and vice versa, thereby providing for interchangeability in every particular.

It will also be seen that the bearings can be made as an article of manufacture, being adapted to occupy any position in the box, and, also, that instead of forming the bearings for each section of box in two parts, if desired, the bearing can be the entire length of the box, with any desired number of perforations for feed of lubricant, with a corresponding number of plugs for closing the perforations in the bearing in the lower section of the box.

What I claim, and desire to secure by Letters Patent, is—

1. In a journal-box, interchangeable bearings provided with perforations for the feed of lubricant, each bearing having removable plugs to close the perforations when such bearings are changed from upper to lower positions in the box, as and for the purpose set forth.

2. A journal-box having lower and upper sections, the sections provided with recesses at diametrically opposite points, in combination with separate bearings, each having a ledge formed upon one side to fit in said recesses, as and for the purpose set forth.

3. A journal-box having upper and lower sections, the sections provided with recesses at diametrically opposite points, in combination with separate bearings, each having a ledge formed upon one side to fit in said recesses, and packings located between the box and the bearings, as and for the purpose set forth.

In testimony that I claim the foregoing as my own I hereby affix my signature in presence of two witnesses.

JONAS H. ALDRICH.

Witnesses:
WILLIAM WEBSTER,
CARROLL J. WEBSTER.